(12) United States Patent
Deng et al.

(10) Patent No.: US 6,714,424 B2
(45) Date of Patent: Mar. 30, 2004

(54) DEAD-TIME COMPENSATION WITH NARROW PULSE ELIMINATION IN SOLID-STATE SWITCH DEVICES

(75) Inventors: Doug D. Deng, Canton, MI (US); Kon-King M. Wang, Canton, MI (US); Steven J. Kowalec, Plymouth, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/306,833

(22) Filed: Nov. 27, 2002

(65) Prior Publication Data
US 2004/0037097 A1 Feb. 26, 2004

Related U.S. Application Data
(60) Provisional application No. 60/421,128, filed on Nov. 30, 2001.

(51) Int. Cl.$^7$ ............................ H02M 3/335; H02M 1/12
(52) U.S. Cl. ........................ 363/17; 363/41; 363/56.03
(58) Field of Search ................. 363/16, 17, 40, 363/41, 56.03, 56.05, 98

(56) References Cited

U.S. PATENT DOCUMENTS

| | | | |
|---|---|---|---|
| 4,814,962 A | * 3/1989 | Magalhaes et al. ........... 363/16 |
| 5,099,408 A | 3/1992 | Chen et al. ................... 363/41 |
| 5,253,155 A | 10/1993 | Yamamoto ................... 363/71 |
| 5,379,209 A | 1/1995 | Goff ........................... 363/132 |
| 5,475,293 A | * 12/1995 | Sakai et al. .................. 318/802 |
| 5,493,487 A | 2/1996 | Close et al. ................. 363/132 |
| 5,550,450 A | 8/1996 | Palko et al. ................. 318/800 |
| 5,555,494 A | * 9/1996 | Morris ......................... 363/17 |
| 5,623,192 A | 4/1997 | Yamamoto ................... 318/811 |
| 5,633,788 A | 5/1997 | Tanaka et al. ................ 363/41 |
| 5,689,170 A | 11/1997 | Ishikawa ..................... 318/811 |
| 5,706,186 A | 1/1998 | Blasko ........................ 363/41 |
| 5,764,024 A | 6/1998 | Wilson ........................ 318/805 |
| 5,811,949 A | 9/1998 | Garces ........................ 318/448 |
| 5,850,132 A | 12/1998 | Garces ........................ 318/599 |
| 5,867,380 A | * 2/1999 | Lee ............................. 363/98 |
| 5,872,710 A | 2/1999 | Kameyama .................. 363/95 |
| 5,907,479 A | * 5/1999 | Leu ............................. 363/16 |
| 5,917,721 A | 6/1999 | Kerkman et al. ............. 363/98 |
| 5,991,176 A | 11/1999 | Saada et al. .................. 363/58 |
| 6,009,005 A | 12/1999 | Kim ............................ 363/95 |
| 6,023,417 A | 2/2000 | Hava et al. ................... 363/41 |
| 6,058,037 A | 5/2000 | Shibata et al. ............. 363/132 |
| 6,088,246 A | 7/2000 | Okuyama et al. ............. 363/41 |

* cited by examiner

Primary Examiner—Bao Q. Vu
(74) Attorney, Agent, or Firm—Seed IP Law Group PLLC

(57) ABSTRACT

The present invention relates to a system and method for compensating the voltage distortion and minimizing the available voltage range loss both caused by switching dead-time of solid-state switch components in power conversion devices. As a result, the power quality supplied from the power conversion devices can be improved and the output voltage of such devices can be increased.

20 Claims, 9 Drawing Sheets

First Half PWM Cycle

Second Half PWM Cycle

DEAD-TIME COMPENSATION WITH NARROW PULSE ELIMINATION IN SOLID-STATE SWITCH DEVICES

CROSS-REFERENCE TO RELATED APPLICATION

This application claims the benefit under 35 U.S.C. §119(e) of the currently co-pending U.S. Provisional Patent Application Ser. No. 60/421,128, filed Nov. 30, 2001, entitled "DEAD-TIME COMPENSATION WITH NARROW PULSE ELIMINATION IN SOLID-SWITCH DEVICES," converted on Nov. 27, 2002 from U.S. Utility Patent Application No. 09/683,202, filed Nov. 30, 2001, via petition filed on Jun. 26, 2002, such applications being hereby incorporated by reference in their entireties.

BACKGROUND OF INVENTION

1. Field of the Invention

The present invention relates generally to dead-time compensation of solid-state power switch components in electronic devices such as inverters and converters. Specifically, the preferred embodiments of the present invention relate to means that compensate the voltage distortion and minimize the available voltage range loss of electronic devices both caused by switching dead-time of solid-state power switches in such devices.

2. Description of the Related Art

In modern power inverter/converter technology, a switching power device, such as an insulated gate bipolar transistor (IGBT), is often utilized to convert direct-current (DC) power into alternating-current (AC) power and pulse width modulated (PWM) method is widely adopted in switching pattern control. FIG. 1A shows part of a one-phase configuration of a DC-to-AC power converter (inverter) 100. Although not shown in the figure, it should be understood by those skilled in the art that the current Ia is going out to a load having one end connected to node a; with the other end of the load connected to another pair of transistors and diodes that are arranged in a similar manner to solid-state power switch components 110, 130 and diodes 120, 140. The switches 110 and 130 can be any solid-state transistors, such as IGBTs.

In a power conversion application such as shown in FIG. 1A one of the big concerns is the harmonic voltage generated from the inverter 100. The harmonic voltage is caused by the non-linearity behaviors of the switching operation of the inverter 100. A major non-linearity is introduced by the dead-time required for the solid-state power switches 110 and 130. This is because it is well known that there is no ideal switching component that can turn on and turn off instantaneously. To guarantee that both switches 110 and 130 in an inverter such as the one shown in FIG. 1A never conduct simultaneously a small blanking time, conventionally called dead-time, is inserted between the gate signals of the turning-off and turning-on switches to avoid a so-called shoot-through of the DC power source. This dead-time is used to delay for a short period of time for the coming-on switch to be turned on from the moment when the coming-off switch is turned off (i.e., when the falling edge of the coming-off switch occurs). FIG. 1B shows the dead-time between the off edge of the switch or IGBT 130 and the on edge of the switch or IGBT 110. FIG. 1C shows the inverter output voltage $V_{an}$ in a PWM cycle with gate drive signal as in FIG. 1B at the conditions of output current $Ia \geq 0$ and $Ia<0$. Because of the dead time shown in FIG. 1B, a voltage waveform distortion is induced as shown in FIG. 2. In the figure, curve 211 shows the average output voltage waveform from an inverter, such as inverter 100 shown in FIG. 1A, with ideal switching components having no dead-time requirement. As a result, the curve 211 has a very good sinusoidal waveform. Curve 212, however, shows the average output voltage from an inverter with dead time added as required for actual switching components. As seen, curve 212 is severely distorted around the zero crossing (of the phase current Ia shown by curve 213) when compared to the ideal sinusoidal waveform of curve 211. Curve 212 also shows that the inverter output AC voltage is lower than the nominal voltage (of ideal curv 211) in the half cycle corresponding to positive half cycle of current Ia shown in curve 213; whereas, the inverter output AC voltage is higher than the nominal voltage in the voltage half cycle corresponding to negative half cycle of the phase current Ia. Due to the dead-time effect, the voltage distortion becomes more severe at the point of current polarity change, i.e., zero crossing.

The voltage loss (or gain) between the nominal or ideal voltage curve 211 and the distorted voltage curve 212 in FIG. 2 can be compensated by a compensation voltage waveform as shown by Curve 214. The compensation voltage 214 is the amount of voltage loss, as defined by the difference between the nominal voltage 211 and the distorted voltage 212. However, the attention should not only be put to the exact amount of voltage loss compensation but also to the right moment of the compensation. FIG. 3 shows the inverter voltage distortion with correct voltage amount compensation but not at the right moment. Again, curve 311 is a copy of the phase current Ia waveform 213 shown in FIG. 2. Curve 312 is a copy of the distorted voltage waveform 212 shown in FIG. 2 without any dead-time compensation. Curve 313 is a copy of the compensation voltage 214 shown in FIG. 2. Curve 314 shows the resulting voltage waveform which is even more distorted than the distorted voltage waveform 212 because the compensation was not done at the right moment. For a three-phase inverter with three legs, each as shown in FIG. 1A, the voltage distortions as shown in curve 212 of FIG. 2 and curve 314 in FIG. 3 will generate severe $5^{th}$ and $7^{th}$ harmonics that will deteriorate the power quality for a three phase power system.

Besides the voltage distortion effect, the dead-time has another negative impact on the performance of the inverter 100. This dead-time takes part of a PWM cycle time and reduces the portion in a PWM cycle used to control IGBT's on or off time. In other words, when the dead time in a PWM cycle gets larger, the available time range for IGBT's on or off gets smaller, and a smaller output voltage range can be obtained from the inverter 100 with certain DC voltage. This dead-time effect is illustrated in FIGS. 1B and 1C. As shown in FIG. 1C, because of the dead time effect, $V_{an}$ when $Ia \geq 0$ has a smaller voltage width than $V_{an}$ when $Ia<0$. Thus, the average voltage magnitude of $V_{an}$ when $Ia \geq 0$ is less than the average voltage magnitude of $V_{an}$ when $Ia<0$. The following example is used to further explain this dead time effect.

Let's assume the inverter PWM cycle is 100 $\mu s$ (microseconds) and the maximum or nominal AC output voltage from the inverter with 0 $\mu s$ dead-time is 1.0. Table 1 shows the maximum inverter output voltages when various amounts of dead time is added.

TABLE 1

| Dead time ($\mu s$) | 2.0 | 4.0 | 6.0 |
|---|---|---|---|
| Per unit output voltage | 0.98 | 0.92 | 0.88 |

For instance, when the added dead time is 2.0 $\mu s$, the actual amount of dead time in a PWM cycle of 100 $\mu s$ is twice the amount of the dead time. This is because a dead time is added to each side of the pulse in the PWM cycle, as shown in FIG. 1B. Thus, with 4 μs out of 100 μs attributed to dead time in a PWM cycle, the resulting output voltage can only be obtained from the remaining 96 μs at 0.96.

BRIEF SUMMARY OF THE INVENTION

The above background introduction shows that switching dead-time of solid-state power switch components, such as IGBTs, in an electronic device, such as an electronic stationary inverter, can cause output voltage distortion and voltage utilization reduction for the inverter from a direct-current (DC) power source. The inventors have found that the time delay (phase lagging) between the actual current changing polarity and the compensation voltage changing polarity is very important to effectively compensate the voltage distortion caused by the dead-time. Furthermore, not only the exact amount of voltage drop due to dead-time needs to be compensated to obtain high quality power, but also the voltage drop needs to be compensated at the right moment.

Accordingly, the preferred embodiments of the present invention provides a system and method of "quadrant PWM cycle sampling" to compensate the dead-time of solid-state power switch components such as IGBTs.

The preferred embodiments of the present invention also provide a system and method for shortening the compensation delay time from the moment when the output current of a power converter changes its polarity to minimize the voltage distortion around the time point of current polarity change.

The preferred embodiments of the present invention also provide a system and method of "narrow pulse elimination" to expand the voltage utilization range for solid-switch power converters with certain DC voltage.

The preferred embodiments of the present invention also provide a system and method for improving the power quality supplied from solid-switch power converters and increasing the output AC voltage magnitude range of such power converters.

Additional aspects and novel features of the invention will be set forth in part in the description that follows, and in part will become more apparent to those skilled in the art upon examination of the disclosure.

BRIEF DESCRIPTION OF DRAWINGS

The preferred embodiments are illustrated by way of example and not limited in the following figures, in which.

DETAILED DESCRIPTION OF THE INVENTION

Figure 4:
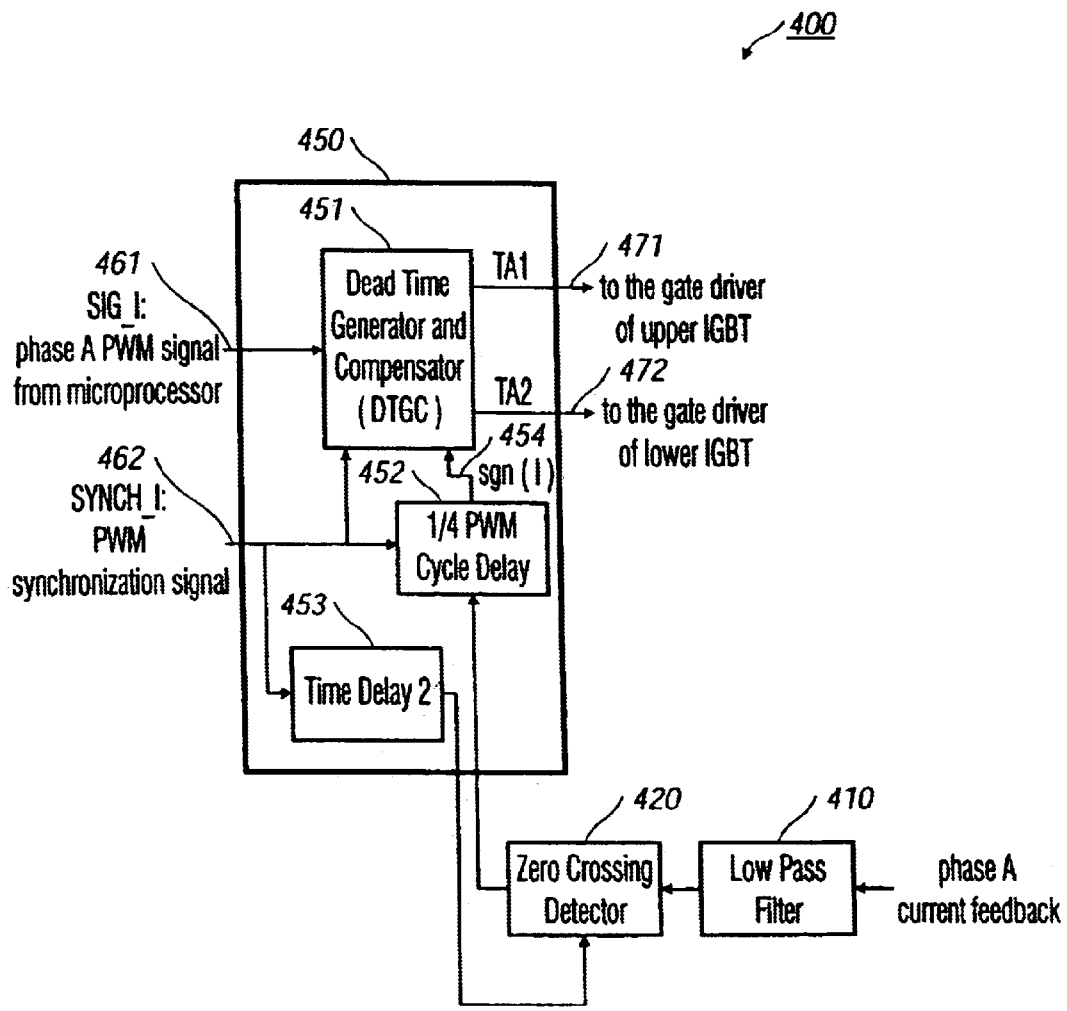
FIG. 4 depicts a dead time compensation architecture in accordance with an embodiment of the present invention.

Reference is now made in detail to various preferred embodiments of the present invention, examples of which are illustrated in the accompanying drawings. FIG. 4 shows a dead-time compensation architecture 400 for use with an electronic switching device such as the inverter 100 shown in FIG. 1, in accordance to one embodiment of the present invention. The architecture 400 comprises a switching control module 450 to the gates of switches 110 and 130, respectively, a zero crossing detector 420, and a low pass filter 410. The switching control module 450 includes: a dead-time generator and compensator (DTGC) 451, a ¼ PWM cycle delay component 452, a time delay component 453, and outputs TA1 signal 471 and TA2 signal 472 that are connected to the gates of switches 110 and 130, respectively, of the inverter 100 to control the inverter switching. The architecture 400 receives a feedback of the load current, i.e., the output current, Ia of the inverter 100 in order to provide dead-time compensation to the inverter switches 110 and 130.

Figure 2:
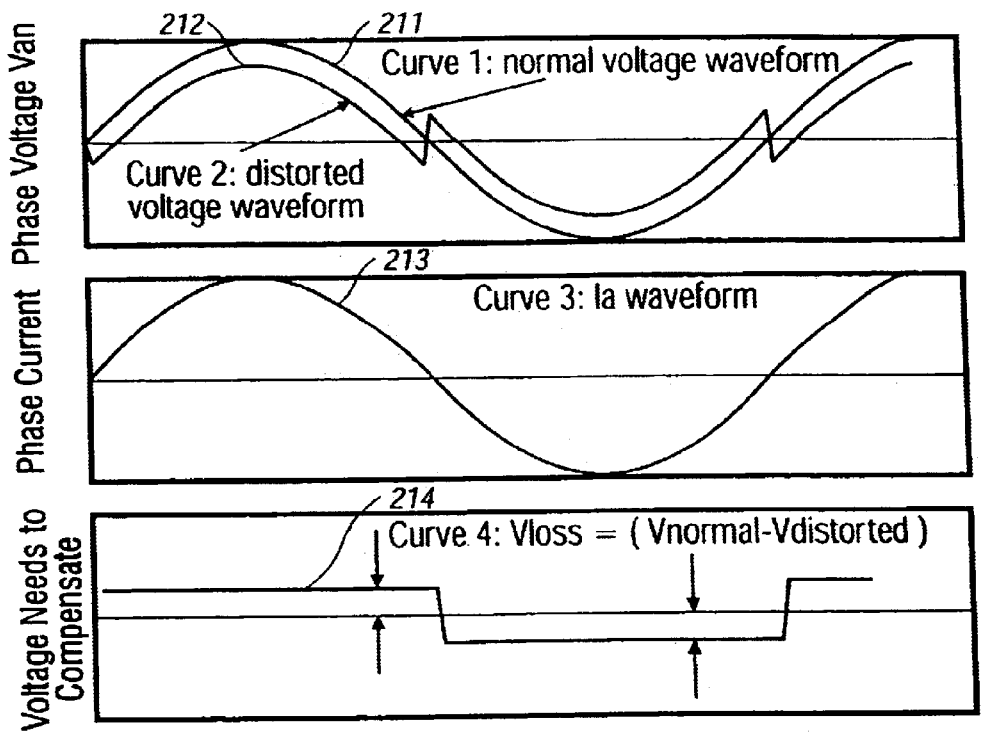
FIG. 2 depicts the dead time voltage distortion and voltage compensation for the power conversion application shown in FIG. 1A.
Figure 3:
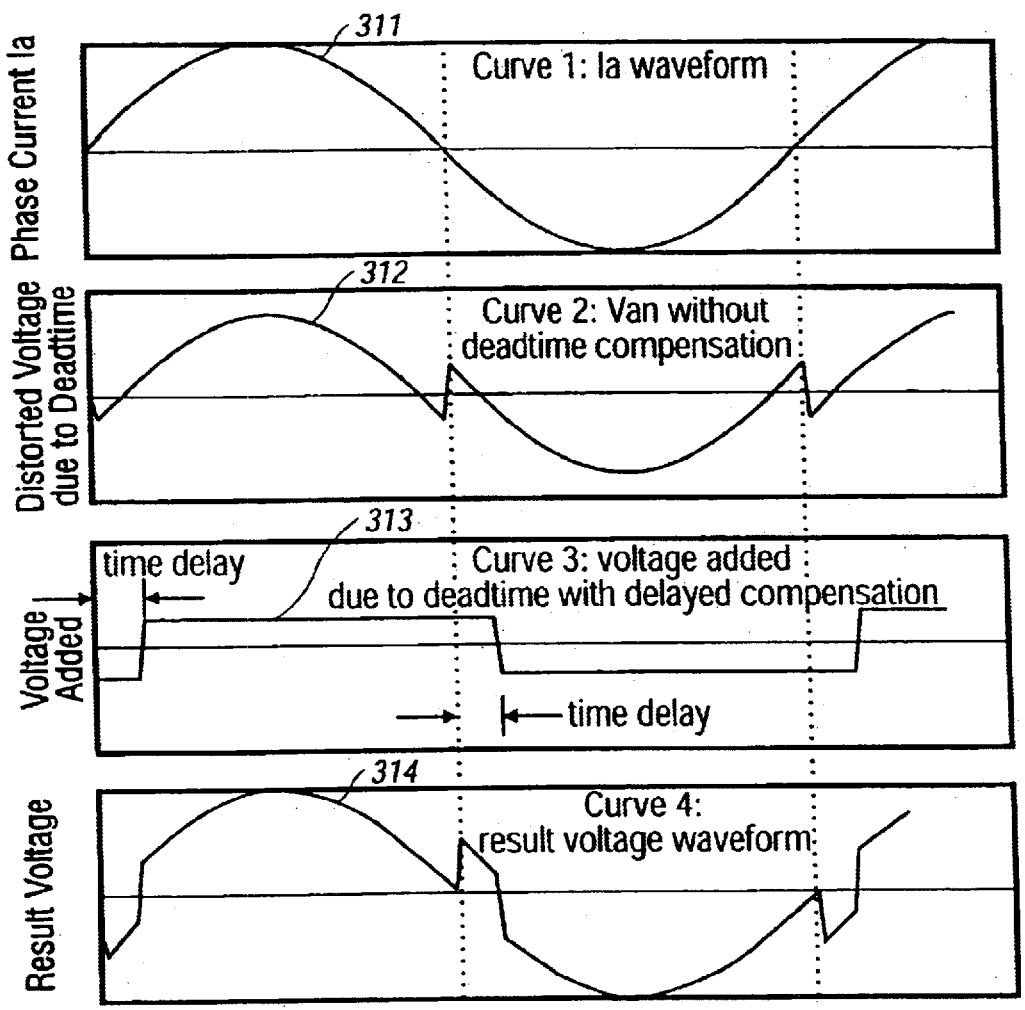
FIG. 3 depicts the effect of the compensation time alignment between the current and compensation voltage waveforms for the power conversion application shown in FIG. 1A.

As known in the art, the actual load current Ia of an inverter is not a pure Sine wave as depicted by curve 213 in FIG. 2. Rather, the load current Ia may be a sinusoidal signal with switching noise added. For instance, the load current a may comprise a fundamental component at 60 Hz with 4 KHz and 8 KHz switching noise components riding on top of the fundamental component. Thus, th low pass filter 410 is used to separat the fundamental component from the switching noise. Because the load current Ia has more than one frequency component, it may experience a phase shift due to the interaction of the multiple frequency components. Thus, to ensure that the zero crossing detector 420 senses true zero crossings, a time delay component 453 is used as commonly done in the art to compensate for the phase shift.

Figure 1:
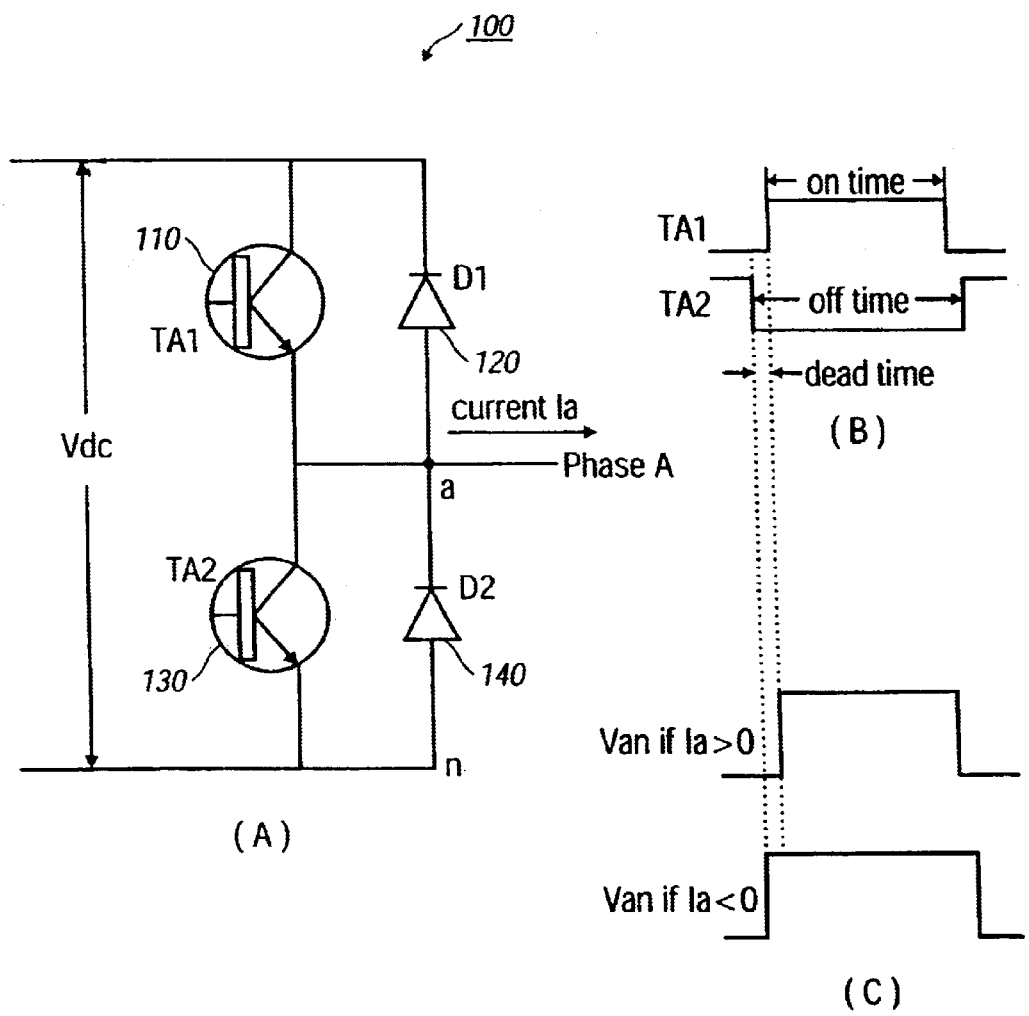
FIG. 1A depicts a circuit for power conversion application to which the present invention is beneficial.
FIG. 1B depicts the on time, off time, and dead time characteristics of the switching devices shown in FIG. 1A.
FIG. 1C depicts the output voltage waveform of the power conversion application shown in FIG. 1A.

The various components of the architecture 400 is synchronized by a synchronization PWM signal SYNCH_1 462 from a pulse width modulator or microprocessor. The DTGC 451, synchronized by the SYNCH_1 signal, creates the TA1 signal 471 and TA2 signal 472 based on the input SIG_1 signal 461 and the detected sgn(i) current polarity signal 454. The SIG_1 PWM signal 461 also comes from the pulse width modulator or microprocessor that generates the SYNCH_1 signal 462. The SYNCH_1 has twice the PWM carrier frequency, i.e., it has a cycle that is half of the PWM cycle. The sgn(i) signal 454 tracks the polarity changes in the current feedback of the load current of the inverter 100 (FIG. 1). The TA1 and TA2 signals at 471 and 472, which have been properly offset for the necessary dead-time according to the current polarity, are sent to the gate drivers of switches or IGBTs 110 and 130 (FIG. 1).

Figure 5:
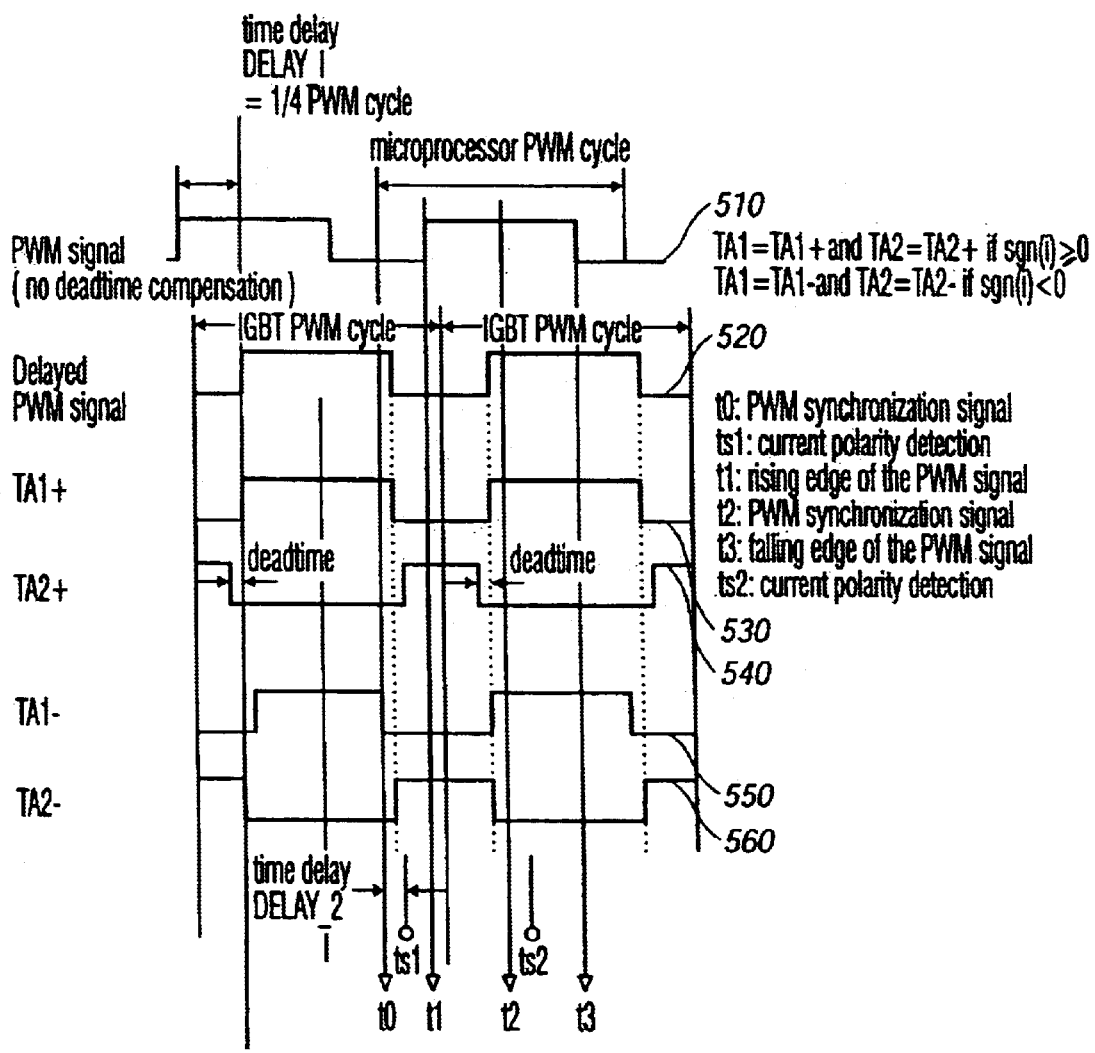
FIG. 5 depicts the timing diagram used for the dead time generator and compensator shown in the dead time compensation architecture depicted in FIG. 4.

FIG. 5 shows the time diagram of the DTGC 451 and other components shown in FIG. 4. TA1+ and TA2+ are the waveforms for TA1 and TA2 signals when the current polarity of the inverter load current Ia is positive (Ia≧0). TA1− and TA2− are the waveforms for TA1 and TA2 signals when the current polarity of Ia is negative (Ia<0). For the figure: DELAY_1 is equal to ¼ of PWM cycle of the SIG_1 signal, i.e., ½ of SYNCH_1 signal cycle; DELAY_1 is the delay generated by the time delay component 453; t0 corresponds to the start of a first cycle of the SYNCH_1 PWM synchronization signal 462; ts1 corresponds to the time of a first current polarity detection; t1 corresponds to the time of the rising edge of SIG_1 PWM signal 461; t2 corresponds to the start of a second cycle of the SYNCH_1 PWM synchronization signal (as mentioned earlier, the SYNCH_1 signal 462 has a cycle that is half that of the SIG_1 PWM signal 461); t3 corresponds to the falling edge of the SIG_1 PWM signal 461.

Figure 8:
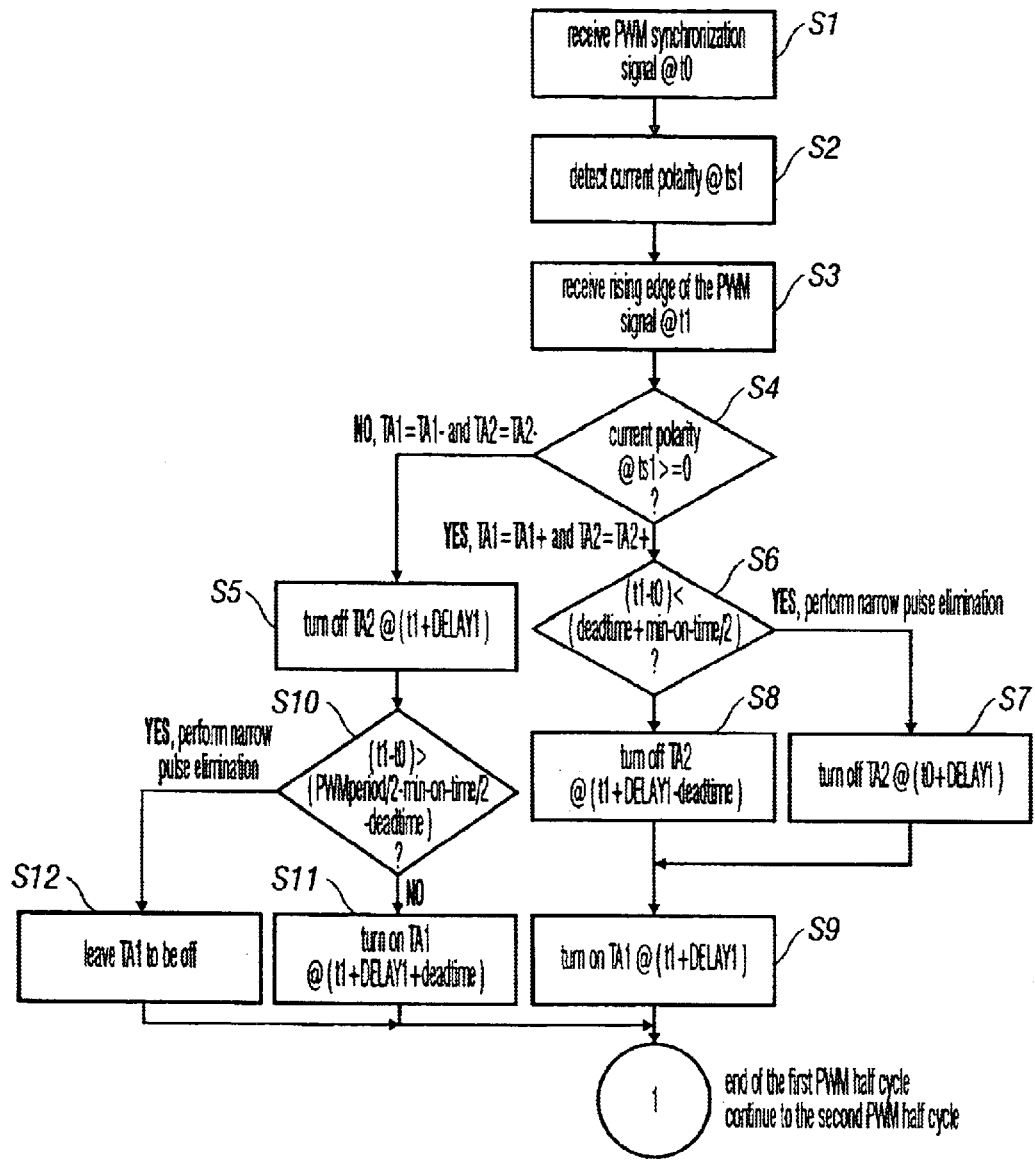
FIG. 8 depicts the dead time compensation algorithm provided by the dead time compensation architecture depicted in FIG. 4 for the first half PWM cycle, in accordance with an embodiment of the present invention.
Figure 9:
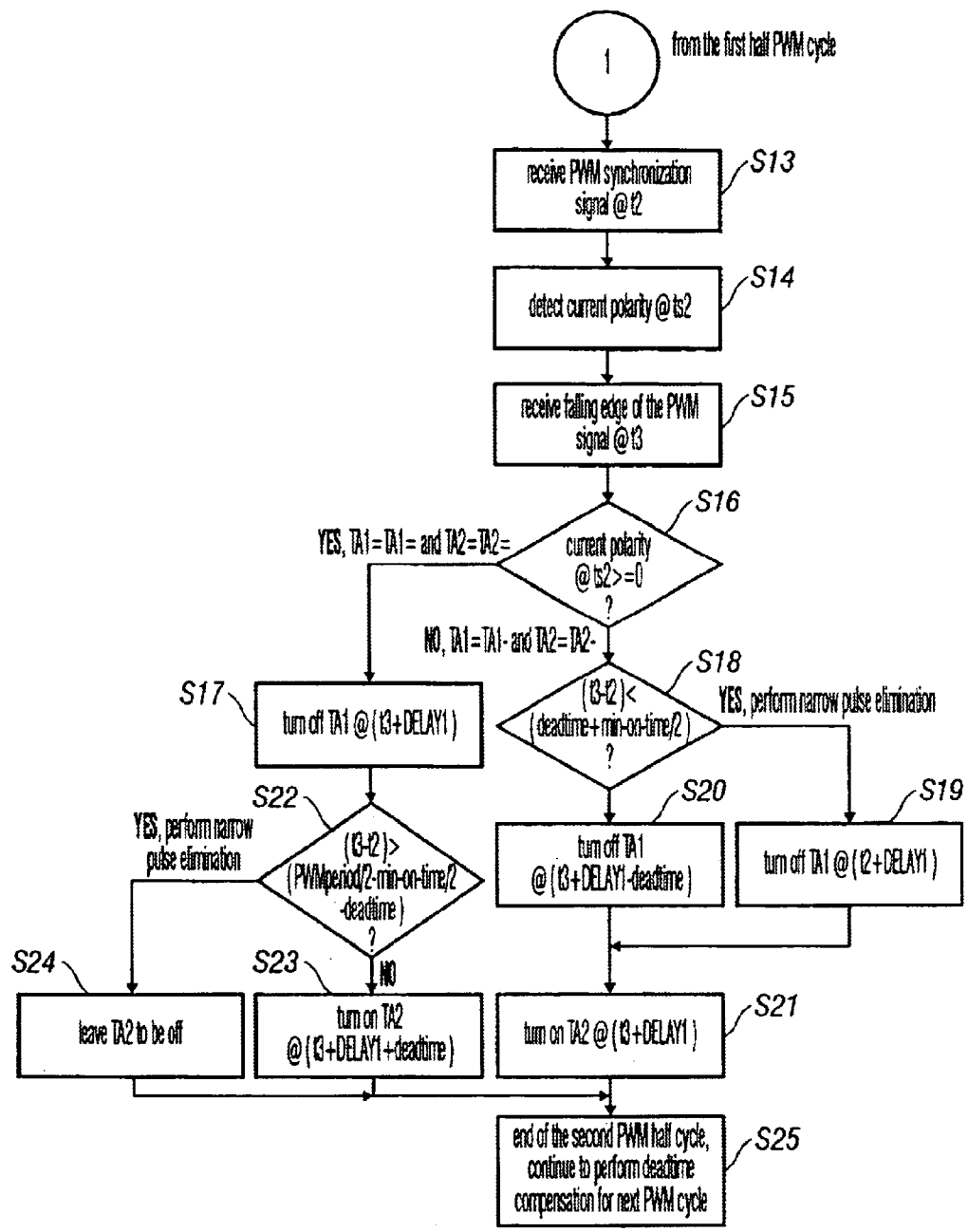
FIG. 9 depicts the dead time compensation algorithm provided by the dead time compensation architecture depicted in FIG. 4 for the second half PWM cycle, in accordance with an embodiment of the present invention.

From the timing diagram in FIG. 5, the compensation scheme according to an embodiment of the present invention provides a predetermined time delay, preferably ¼ of the PWM cycle of the SIG_1 signal, to change the compensation voltage polarity when the detected current feedback changes its polarity for dead-time compensation. As seen in FIG. 5, the TA1 and TA2 signals are delayed by a ¼ of PWM cycle because of the ¼ PWM cycle delay component 452. For instance, the TA1 signal waveform 530 for turning on switch 110 (FIG. 1), TA1+, at Ia≧0 is delayed by a ¼ PWM cycle from the rising edge of SIG_1 PWM signal waveform 510. Likewise, the TA2 signal waveform 560 for turning off switch 130 (FIG. 1), TA2−, at Ia<0 is delayed by ¼ PWM cycle from rising edge of SIG_1 PWM signal waveform 510. The knowledge of the timing for the TA1+ signal waveform 520 allows for the determination of the timing for the TA2+ signal 530 because the dead-time requirement is known from the technical specifications of the solid-state switches 110 and 130 (FIG. 1). FIGS. 8 and 9 show the algorithm or process for generating the compensating scheme and associated time diagram in FIG. 5 at the first and second halves of the PWM cycle of the SIG_1 signal. For the first half of the PWM cycle beginning at the start (t0) of a cycle of the SYNCH_1 synchronization signal 462, blocks S1–S5 and S8–S9 of FIG. 8 provide explanation to actions to be done at various different time points such as t0, ts1, and t1. For the second half of the PWM cycle beginning at the start (t2) of a second cycle of the SYNCH_1 synchronization signal 462, blocks S13–S17 and S20–S21 of FIG. 9 provide explanation to actions to be done at various different time points such as t2, ts2, and t3.

According to another embodiment of the present invention, there is also provided a method and means used to reduce the voltage range loss caused by the dead-time. This "narrow pulse elimination" method is explained next also in reference to the time diagram of FIG. 5. First, let assign a value of "$T_{PWM}$" for the PWM cycle (period) of the SIG_1 signal 510 and a value of "WIDTH" to its pulse width. Thus, from FIG. 5, the pulse width of:

TA1+=WIDTH,

TA2+=(TPWM−WIDTH−2*dead-time),

TA1−=(WIDTH−2*dead-time), and

TA2−=(TPWM−WIDTH).

Also, let minimum pulse width of the switches or IGBTs 110 and 130 (FIG. 1) be $W_{min}$ to avoid gate driver and/or IGBT mis-triggering. Then, without the technique of narrow pulse elimination of the present invention, the possible range of the pulse width of the SIG_1 PWM signal 510 is from ($W_{min}$+2*dead-time) to ($T_{PWM}$−2*dead-time−$W_{min}$) to accommodate the dead-time requirement. As a result, the dead-time dramatically reduces the usable range of the PWM pulse width of the SIG_1 signal 510.

Figure 6:
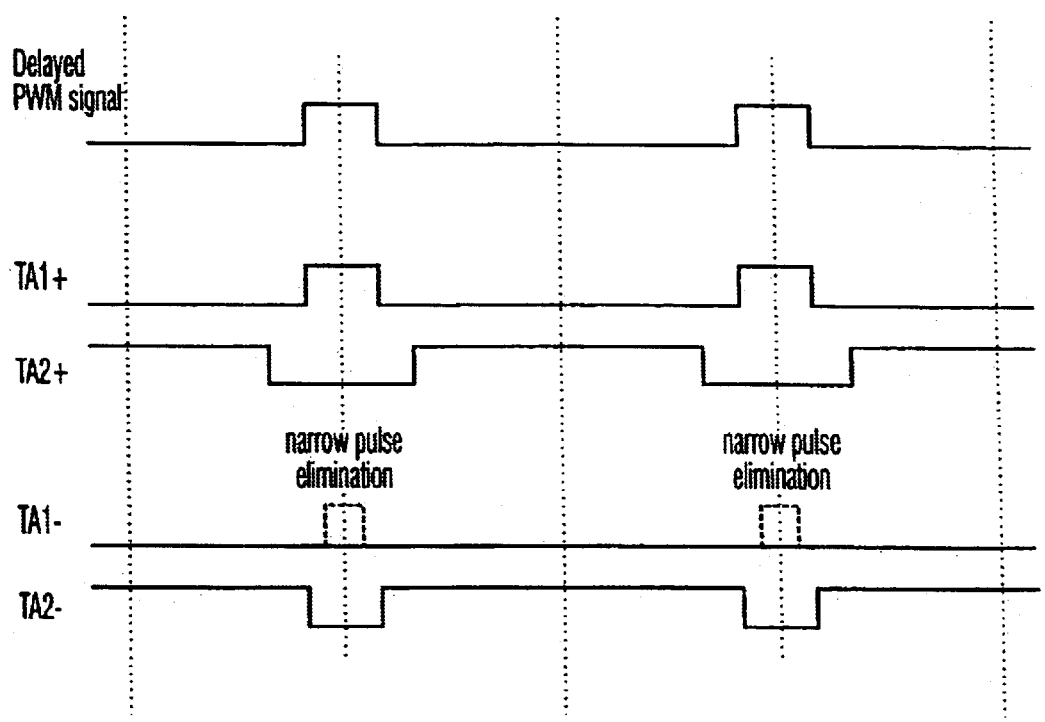
FIG. 6 depicts the results of the narrow pulse elimination technique for short incoming PWM pulse width when sgn (i)<0 (i.e., current is negative), in accordance with an embodiment of the present invention.
Figure 7:
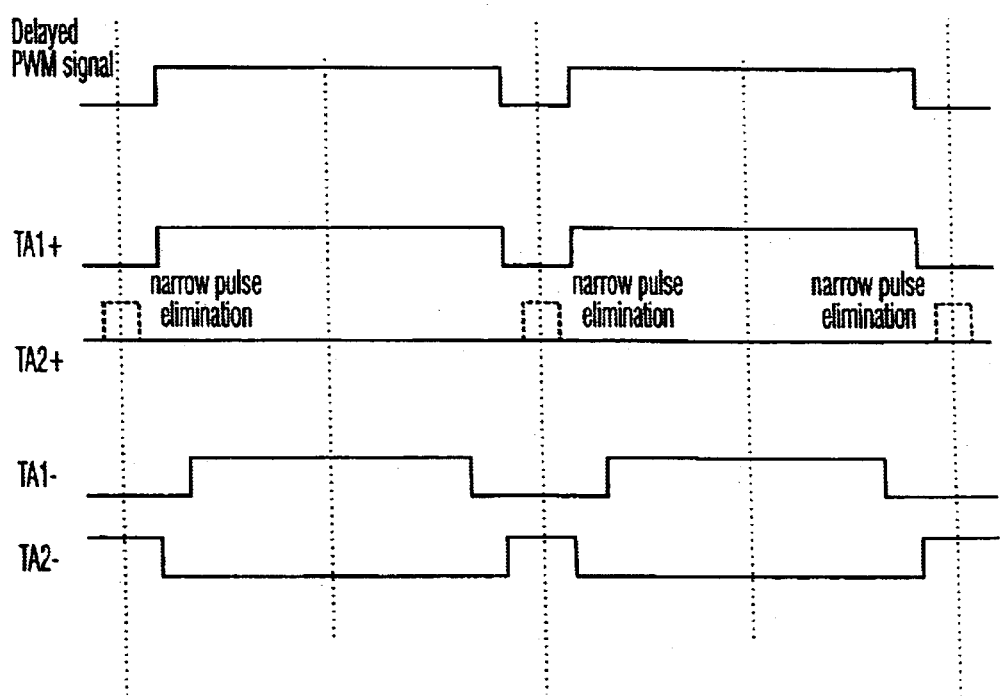
FIG. 7 depicts the results of the narrow pulse elimination technique for long incoming PWM pulse width when sgn (i)≧0 (i.e., current is not negative), in accordance with an embodiment of the present invention.

According to an embodiment of the present invention, the "narrow pulse elimination" scheme can maximize the usable range of the PWM pulse width. With this compensation scheme, the usable range of the PWM pulse width is from $W_{min}$ to ($T_{PWM}$−$W_{min}$), and therefore the power source can be fully utilized. FIGS. 8 and 9 show the algorithm or process for the "narrow pulse elimination" scheme in accordance with one embodiment of the present invention. For the first half of the PWM cycle beginning at the start (t0) of a cycle of the SYNCH_1 synchronization signal 462, blocks S6–S7 and S10–S12 provide explanation to actions to be done for the "narrow pulse elimination" scheme. Likewise, for the second half of the PWM cycle beginning at the start (t2) of a next cycle of the SYNCH_1 synchronization signal 462, blocks S18–S19 and S22–S24 provide explanation to actions to be done for the "narrow pulse elimination" scheme. FIGS. 6 and 7 show examples of waveforms of narrow pulse elimination. It should be noted that the such scheme continues to provide the desirable voltage output but avoids the possibility of mis-triggering the IGBTs 110 and 130 (FIG. 1).

Consequently, the effect of dead-time is removed by the technique of narrow pulse elimination. For example, if $T_{PWM}$=100 μs, dead-time=2.5 μs, $W_{min}$=1.0 μs, without narrow pulse elimination technique, the usable pulse width range for the SIG_1 PWM signal 510 is from 6 μs to 94 μs. With narrow pulse elimination technique, the usable pulse width range is from 1 μs to 99 μs. Therefore the gain of the voltage utilization is (99−1)/(94−6)=1.11. Also, the output voltage magnitude ratio is dramatically improved as shown below, Ratio=94/6=15.7 if without the narrow pulse elimination technique, Ratio=99/1=99 if with the narrow pulse elimination technique.

This ratio is very important for variable speed drive (V/f) application because it determines the variable speed adjustable range. FIG. 6 and FIG. 7 show examples of waveforms of narrow pulse elimination. Note that narrow pulse elimination still provides the desirable voltage output but avoids the possibility of mis-triggering IGBT.

Together, blocks S1–S12 in FIG. 8 provide a dead-time compensation algorithm for the first half of PWM cycle that minimizes the voltage range loss and voltage distortion of the inverter's voltage output. Likewise, together, blocks S13–S24 provide a dead-time compensation algorithm for the second half of PWM cycle that minimizes the voltage range loss and voltage distortion of the inverter's voltage output. At block 25 in FIG. 9, the algorithms of FIGS. 8 and 9 restart for next PWM cycles of the SIG_1 PWM signal 510.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus for controlling a solid-state switch device comprising:
    means for providing a predetermined time delay;
    means for receiving and filtering a feedback of current that the solid-state switch device outputs;
    means for detecting a polarity change in the feedback current; and
    means for receiving a pulse width modulated (PWM) signal and for generating control signals to control a plurality of solid-state switches in the solid-state switch device based on the detected polarity change in the filtered feedback current, and a delay of the PWM signal as caused by the means for providing the predetermined time delay.

2. The apparatus of claim 1, further comprising means for providing a time delay to compensate for a phase shift in the feedback current.

3. A method for compensating dead-time non-linearity in a solid-state switch device comprising:
    receiving a pulse width modulated (PWM) signal at a first time point;
    receiving a current fed back from an output of the solid-state switch device, wherein the solid-state switch device comprises a plurality of switch components;
    detecting a polarity change in the feedback current at a second time point;
    detecting a rising edge of the PWM signal at a third time point;
    determining whether the feedback current has a positive or negative polarity subsequent to the detected polarity change; and
    if the feedback current has a positive polarity subsequent to the detected polarity change, outputting a first control signal to activate a first switch component of the solid-state switch device a predetermined time delay after the third time point.

4. The method of claim 3, further comprising:
    if the feedback current has a negative polarity subsequent to the detected polarity change, outputting the first control signal to activate the first switch component of the solid-state switch device after the predetermined time delay and a dead time associated with the first switch component.

5. The method of claim 3, wherein the second time point is at a later time than the first time point.

6. The method of claim 3, wherein the third time point is at a later time than the second time point.

7. The method of claim 3, further comprising:
    if the feedback current has a negative polarity subsequent to the detected polarity change, output a second signal to de-activate a second switch component of the solid-state switch device after the predetermined time delay from the third time point.

8. The method of claim 3, further comprising:
    if the feedback current has a positive polarity subsequent to the detected polarity change, outputting a second control signal to de-activate a second switch component of the solid-state switch device after a set time from the third time point, wherein the set time equals to the predetermined time delay minus a dead time associated with the second switch component.

9. The method of claim 3, wherein the predetermined time delay equals to a fourth (¼) of a cycle of the PWM signal.

10. The method of claim 3, further comprising:
    if the feedback current has a positive polarity subsequent to the detected polarity change, outputting a second signal to de-activate a second switch component of the solid-state switch device after the predetermined time delay from the first time point.

11. A method for compensating dead-time non-linearity in a solid switch device comprising:
    receiving a pulse width modulated (PWM) signal at a first time point;
    receiving a current fed back from an output of the solid-state switch device, wherein the solid-state switch device comprises a plurality of switch components;
    detecting a polarity change in the feedback current at a second time point;
    detecting a falling edge of the PWM signal at a third time point;
    determining whether the feedback current has a positive or negative polarity subsequent to the detected polarity change; and
    if the feedback current has a negative polarity subsequent to the detected polarity change, outputting a first control signal to de-activate a first switch component of the solid-state switch device a predetermined time delay after the third time point.

12. The method of claim 11, further comprising:
    if the feedback current has a positive polarity subsequent to the detected polarity change, outputting the first control signal to de-activate the first switch component of the solid-state switch device a set time after the third time point, wherein the set time equals to the predetermined time delay minus a dead time associated with the first switch component.

13. The method of claim 11, further comprising:
    if the feedback current has a positive polarity subsequent to the detected polarity change, outputting the first control signal to de-activate the first switch component of the solid-state switch device after the predetermined time delay from the first time point.

14. The method of claim 11, further comprising:
    if the feedback current has a positive polarity subsequent to the detected polarity change, outputting a second control signal to activate a second switch component of the solid-state switch device after the predetermined time delay from the third time point.

15. The method of claim 11, further comprising:
    if the feedback current has a negative polarity subsequent to the detected polarity change, outputting a second control signal to activate the second switch component of the solid-state switch device a set time after the third time point, wherein the set time equals the predetermined time delay and a dead time associated with the second switch component.

16. A power conversion device comprising:

an upper switch connected between a positive terminal of a DC source and a load;

a lower switch connected between a negative terminal of the DC source and the load;

a switching control module having a dead-time compensator including a first output coupled to a control of the upper switch and a second output coupled to a control of the lower switch; and a zero crossing detector having an input coupled to the load, and an output coupled to an input of the dead-time compensator.

17. The power conversion device of claim 16, wherein at least one of the upper switch and the lower switch comprises a power transistor.

18. The power conversion device of claim 16, wherein at least one of the control of the upper switch and the control of the lower switch comprises a gate of a power transistor.

19. The power conversion device of claim 16, wherein the DC source comprises at least one of a battery, a fuel cell, an energy storage device, and an electric power utility.

20. The power conversion device of claim 16, wherein the load comprises at least one of an electric motor and a variable speed drive.

* * * * *

UNITED STATES PATENT AND TRADEMARK OFFICE
CERTIFICATE OF CORRECTION

PATENT NO. : 6,714,424 B2
DATED : March 30, 2004
INVENTOR(S) : Doug D. Deng et al.

It is certified that error appears in the above-identified patent and that said Letters Patent is hereby corrected as shown below:

<u>Column 7,</u>
Line 67, "output" should read as -- outputting --

Signed and Sealed this

Twenty-first Day of September, 2004

JON W. DUDAS
*Director of the United States Patent and Trademark Office*